United States Patent [19]
Lomicka et al.

[11] Patent Number: 5,179,554
[45] Date of Patent: Jan. 12, 1993

[54] AUTOMATIC ASSOCIATION OF LOCAL AREA NETWORK STATION ADDRESSES WITH A REPEATER PORT

[75] Inventors: Jeffrey Lomicka, Maynard; Willem Engelse, Townsend, both of Mass.

[73] Assignee: Digital Equipment Corporation, Maynard, Mass.

[21] Appl. No.: 682,186

[22] Filed: Apr. 8, 1991

[51] Int. Cl.$^5$ .......................................... H04L 12/46
[52] U.S. Cl. .................................. 370/85.13; 370/92; 370/97
[58] Field of Search ..................... 370/85.13, 85.14, 92, 370/110.1, 97, 79, 13; 371/20.1

[56] References Cited

U.S. PATENT DOCUMENTS

| | | | |
|---|---|---|---|
| 4,737,953 | 4/1988 | Koch et al. | 370/85.13 |
| 4,825,435 | 4/1989 | Amundsen et al. | 370/97 |
| 4,922,503 | 5/1990 | Leone | 370/85.13 |
| 5,008,884 | 4/1991 | Yazawa et al. | 370/60 |
| 5,018,137 | 5/1991 | Backes et al. | 370/85.14 |
| 5,060,228 | 10/1991 | Tsutsui et al. | 370/85.13 |

OTHER PUBLICATIONS

International Publication WO 90/16026 to Craven, published Dec. 27, 1990.

Primary Examiner—Douglas W. Olms
Assistant Examiner—Min Jung
Attorney, Agent, or Firm—Cesari and McKenna

[57] ABSTRACT

Automatic tracking of the topology of an extended local area network by augmenting a station address list kept by a bridge with a list of repeater numbers and repeater port numbers. The bridge periodically iterates through its list of stations to select a station address. The selected address table is forwarded to all of the repeaters connected to the bridge. The repeaters watch for the selected address appearing as a source address in a message on one of their ports. If the address is seen, they report the repeater port number back to the bridge. Because the repeaters are interconnected such that a predetermined port number is always used as the common port between repeaters, any possible ambiguities are eliminated.

20 Claims, 3 Drawing Sheets

| | |
|---|---|
| 100 | INITIALIZE repeater numbers and port numbers in station table to 'Unknown' |
| 110 | FOR each entry in bridge station table |
| 120 | READ current station address from table |
| 130 | SEND current station address to all repeaters |
| 140 | WAIT for repeaters to detect message traffic |
| 150 | FOR each repeater connected to this bridge |
| 160 | POLL current repeater for port number |
| 170 | IF port number < > 'unknown' and port number < > 0 |
| 180 | STORE repeater number in station table |
| 190 | STORE port number in station table |
| 200 | END |
| 210 | NEXT repeater |
| 220 | NEXT entry |
| 230 | UPON poll by network administrator |
| 240 | RECEIVE station address |
| 250 | LOCATE station address in bridge table |
| 260 | READ repeater number and port number |
| 270 | SEND repeater number and port number to network administrator |
| 280 | END |

FIG. 2

300  INITIALIZE port number to 'unknown'

310  RECEIVE current station address from bridge

320  STORE current station address in memory

330  FOR each message received from any port

340      READ source address and port number

350      IF message source address equals current station address

360          SET port number

370      END IF

380  NEXT message

390  UPON poll by bridge SEND port number to bridge

FIG. 3

AUTOMATIC ASSOCIATION OF LOCAL AREA NETWORK STATION ADDRESSES WITH A REPEATER PORT

CROSS REFERENCE TO RELATED APPLICATIONS

This application is related the following co-pending U.S. patent applications, both of which are assigned to Digital Equipment Corporation, and both of which are hereby incorporated by reference:

"Disposition Filtering of Message Using a Single Address and Protocol Table Bridge", Ser. No. 07/682,187, filed Apr. 8, 1991.

"Multiport Repeater for Communication Media Using Self-Clocking Signals", Ser. No. 07/682,059, filed Apr. 8, 1991.

1. Field of the Invention

This invention relates generally to local area networks and particularly to a technique for automatically isolating the location of a faulty network station to a specific repeater port number.

2. Background of the Invention

Peer-to-peer communication environments such as local area networks (LANs) are now the preferred technique for interconnecting many different computers, or stations, together. While LANs have many advantages, they also have some well-known limitations.

For example, the maximum distance over which a group of stations, or segments, may be interconnected is limited by physical constraints on signaling medium. For the well known Ethernet signaling standard using thin-wire cabling, there is a length limitation of 185 meters for a given segment.

Several devices permit extension of a segment beyond the standard distance. The simplest device, called a repeater, reconditions the LAN signals by amplifying, filtering, and restoring their timing margins. A multiport repeater reconditions the signals incoming on several ports; any signal appearing on one port is regenerated and fed to all the other ports simultaneously.

One common technique for interconnecting a large number of stations is to provide a radial interconnection of several multiport repeaters to form a so-called hub. With this arrangement, the repeaters are connected to one another in a "daisy chain", with one port of each repeater providing a path to the other repeaters. The remaining repeater ports each typically service a single segment of the network.

One example of such a network hub is the Digital Equipment Local Network Interconnect (DELNI) product of Digital Equipment Corporation, as described in U.S. Pat. No. 4,825,435 issued to Amundsen et al.

Another device for interconnecting LAN segments is a so-called "bridge", which isolates the message traffic local to one segment from that on another segment. A bridge operates by detecting all message traffic on each segment. If a message is detected having source and destination stations which are on the same segment, the bridge takes no action. If a message is detected having a source station on one segment and a destination address on the other segment, the bridge temporarily stores the message and forwards it to the other segment when the latter segment becomes available. In order to perform this function, a bridge typically maintains a station table which includes the addresses of the stations connected to each segment.

LANs in a medium-to-large organization may typically extend over several floors or even between several different buildings. These so-called extended LANs typically include several bridges and repeaters.

Extended LANs present a difficult problem in locating faults. Most store and forward bridges perform frame check-sum calculations on every message which is forwarded by them, and this calculation may be used as a diagnostic tool to determine when stations are malfunctioning. Certain multiport repeaters may also be configured to report back to a network administrator station when one or more of its ports is faulty.

However, in order to locate a malfunctioning station, the network administrator must often physically locate it quickly, with minimum disruption to other network users. Unless the network administrator carefully records the repeater and bridge interconnections, repeater port numbers, station addresses, and physical location of every network device, a faulty device must be manually located by tracing the network cabling.

At present there is no automatic way to inform the network administrator of the entire network topology to the repeater port level, since there is no way of correlating network addresses to particular ports.

To better understand why this is a problem, consider an example in which a station having the address "CA42" (hexadecimal) is malfunctioning by repeatedly sending corrupted messages. The network administrator can usually determine that the erroneous messages are originating from the station whose address is "CA42", but without additional information, the physical location of the station is not known.

What is needed is a way to automatically determine the topology of a local area network, by correlating the station addresses to the repeater port numbers to which they are connected. This would allow quicker fault isolation, since by simply knowing the station address of the corrupted message, the repeater and port number could be quickly determined by an automatic table look-up. Once a fault is isolated to a repeater port, only a single network segment needs to be manually traced to locate the malfunctioning station.

SUMMARY OF THE INVENTION

Briefly, the invention is a mechanism for automatically tracking the topology of an extended local area network by associating a repeater port number with each address in a list of station addresses, such as the station address list usually kept in a bridge.

The repeater port numbers are determined by having a bridge periodically iterate through its station address list to determine a next selected address. The selected address is then forwarded to all of the repeaters connected to the bridge.

The repeaters wait for the selected address to appear as a source address in a message received on one of their ports. When the address is seen, the repeater stores it in memory.

Upon receiving a request, the repeater then reports the port number back to the bridge. Because the repeaters are interconnected in such a way that a predetermined port number is always used as the common port shared by multiple repeaters, any possible ambiguities are eliminated. Only the repeater to which the station is actually connected will report seeing the new address on a non-shared port number. The identification of the reporting repeater and port number is then stored in a memory location associated with the selected address.

It may take some time for the data in the port number table to be completed, depending upon the amount of network message traffic. This does not pose a problem in most instances, since the bridge can update the table continuously, and whenever such updating is convenient.

Thus, by adding only minimal additional functionality to repeaters and bridges in an extended LAN, the network topology may be easily and automatically determined to the repeater port level, given only a list of station addresses. This level of granularity in network topology determination has heretofore not been available.

BRIEF DESCRIPTION OF THE DRAWINGS

The above and further advantages of the invention may be better understood by referring to the following description in conjunction with the accompanying drawings, in which:

FIG. 2 is a flow chart of the operations performed by the bridge of FIG. 1; and

FIG. 3 is a flow chart of the operations performed by the repeaters of FIG. 1.

DETAILED DESCRIPTION OF ILLUSTRATIVE EMBODIMENTS

Figure 1:
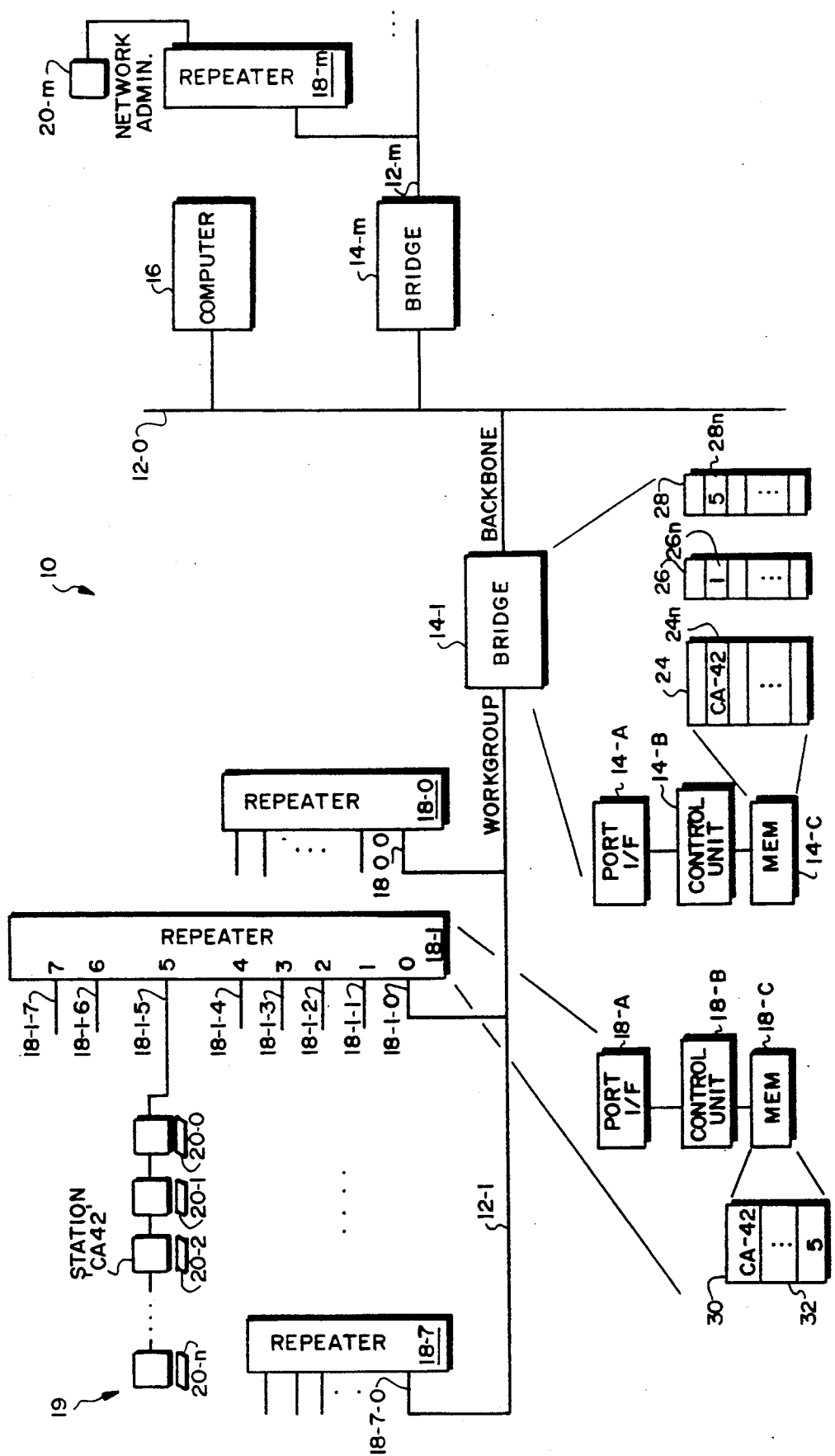
FIG. 1 is a block diagram of an extended LAN depicting a workgroup bridge, multiple repeaters, and the information stored in the repeaters and the bridge during the process of automatically determining the network topology in accordance with the invention.

FIG. 1 shows an extended local area network (LAN) 10 including multiple physical media (e.g. cables) 12-0, 12-1, ... and 12-m (collectively, media 12), bridges 14-1, and 14-m (collectively, bridges 14), a computer 16, repeaters 18-0, 18-1, ... 18-7, and 18-m, (collectively, repeaters 18) and stations 20-0, 20-1, 20-2, ..., 20-n, and 20-m (collectively, stations 20). The stations 20 are physically connected to network segments that are in turn coupled to ports of the respective repeaters 18.

The stations 20 connected to the extended LAN 10 communicate with one other as though they were all connected on the same segment. That is, the operation of the bridges 14 and repeaters 18 is such that they are transparent to the stations 20 and no special station equipment is required for any given station 20 to communicate with any other station 20.

The medium 12-0 serves as a so-called backbone medium for interconnecting the bridges 14-1 and 14-m and other primary devices such as the computer 16. The port of the bridge 14-1 connected to the backbone medium 12-0 is thus referred to as the backbone port.

The other port of the bridge 14-1 is referred to as the workgroup side, as it is connected to a workgroup medium 12-1. Along the workgroup medium 12-1 are connected several repeaters 18-0, 18-1, ..., and 18-7. An exemplary repeater 18-1 has eight ports, numbered "0" through "7", with a particular port number "5" given reference numeral 18-1-5 in FIG. 1. In the illustrated LAN 10 there are eight interconnected repeaters 18; other configurations may have different numbers of repeaters and bridges connected in various ways. The eight repeaters 18 are daisy-chained such that a predetermined port in each repeater, namely "port 0", is the port shared in parallel by all the other repeaters 18.

Repeater port 18-1-5 has connected thereto a single segment 19 consisting of the stations 20-0, 20-1, 20-2 ... and 20-n, interconnected using a suitable medium such as the well known thin wire Ethernet cable. Other media may be used to interconnect the stations in segment 19.

For purposes of this discussion, it is assumed that the network address associated with station 20-2 is "CA42" (hexadecimal).

The bridge 14-1 operates, as is well known in the art, to isolate traffic on the workgroup side from traffic on the backbone side. For example, it is quite common for several people in a department to use the network 10 primarily for sharing access to a printer or file server located in their immediate area. The bridge 14-1 keeps that workgroup traffic local to the workgroup medium 12-1, and off the main backbone media 12-0.

In order to isolate message traffic in this way, the bridge 14-1 thus includes a port interface 14-a, control unit 14-b, and a data memory 14-c. The port interface 14-a receives and decodes message traffic from both the workgroup and backbone ports.

The control unit 14-b typically uses a set of locations 24 within the memory 14-c to store a table of the addresses of the stations connected to at least the workgroup side of the bridge 14-1. However, the bridge 14-1 may also maintain a station table for the backbone side if desired.

As is conventional, the bridge 14-1 determines whether or not to forward a message by first determining its source and destination addresses. In particular, the contents of the station table 24 are searched to determine the side of the bridge 14-1 on which the destination station is connected. If a message is detected having a source and destination address on the same side the bridge 14-1 takes no action. If a message is detected having a source address on one side segment and destination address on the other side, the bridge 14-1 temporarily stores the message and forwards it to the other side when that side is available.

For further details of the operation of the preferred embodiment of the bridge 14-1, please refer to the co-pending U.S. application entitled "Disposition of Messages Using a Single Address and Protocol Table Bridge", filed on Apr. 8, 1991, and previously incorporated by reference.

In accordance with the present invention, the control unit 14-b uses other portions of the memory 14-c as a repeater table 26 and a port table 28. The data stored in one location 26n indicates a repeater number, and the data stored in another location 28n indicates a repeater port number. Both these locatins 26n and 28n are associated with the station whose address is stored in location 24n.

An exemplary repeater 18-1 consists of a repeater port interface 18-a, a control unit 18-b, and associated memory 18-c. The interface 18-a performs the customary operations of a repeater, namely detecting messages received on any one of the ports 18-1-0 through 18-1-7, such as port 18-1-3, and regenerating them on the other ports 18-1-0, 18-1-1, 18-1-2, 18-1-4, ..., and 18-1-7. For further details of a preferred embodiment of the port interface and associated regenerator circuits, please refer to co-pending patent application entitled "Multiport Repeater for Communication Media Using Self-Clocking Signals", filed Apr. 8, 1991, given Ser. No. 07/682,059, and previously incorporated by reference.

In accordance with the present invention, the bridge 14-1 communicates with the repeaters 18 to exchange certain information. In particular, the bridge 14-1 periodically selects one of the station addresses stored in its station table 24, such as the address "CA42" stored in location 24n, and forwards the selected address as part of a control message to all of the repeaters 18 on its workgroup side.

When a repeater 18 receives the selected address "CA42" from the bridge 14-1, it stores it in a memory location 30.

Each repeater 18 then watches the message traffic on its ports; when the address "CA42" is seen as a source address on a port the port number is stored in a location 32. The repeater 18-1 will eventually see the address "CA42" on its port number "5", whenever station 20-2 originates a message.

Periodically, the bridge 14-1 later sends another message to the repeaters 18, asking if they have seen the currently selected source address. Repeater 18-1 will thus eventually respond affirmatively to the bridge 14-1, and indicate the port number "5" on which address "CA42" was seen.

Once the bridge 14-1 is informed of a possible location for the address "CA42" by one repeater, it polls the other repeaters 18-0, 18-2, . . . and 18-7 to which it is connected, to determine if and on what port they have seen it as well. In reponse thereto, the other repeaters 18-0, 18-2, . . . and 18-7 will also report the source address "CA42", but will report seeing it on port "0". Since only the repeater 18-1 reports that address "CA42" was seen on a non-zero port number, the bridge 14-1 concludes that repeater port 18-1-5 is the one to which address "CA42" is connected.

By repetitive polling of all repeaters 18 in this manner, the network station tables 24, 26 and 28 will eventually be annotated so that for each of the network addresses 24n connected to a repeater, an associated repeater number 26n and port number 28n will be determined.

One of the network stations 20-m may then be used by a network administrator to query the bridges 14. For example, a message sent to bridge 14-1, providing the address of a particular station such as "CA42", requests the bridge 14-1 to provide repeater and port information for that station. In turn, following a simple table look-up procedure, the bridge 14-1 responds with the repeater and port numbers namely "1,5" to which the station CA42 is presently connected.

The network administrator may also generate a complete topology for the LAN 10 by requesting the entire contents of the tables 24, 26, and 28 from each of the bridges 14 connected to the LAN 10.

FIG. 2 is a structured English description representing a high-level computer language implementation of the sequence of steps performed by the control unit 14-b in the bridge 14-1. It should be understood that these steps may actually be implemented in a microprgram or by special-purpose logic in the control unit 14-b. It should be further understood that these steps may be executed as a background task in the gridge 14-1, since they need not be completed in real time.

The first step 100 sets the repeater numbers 26 and port numbers 28 associated with the station addresses in the station table 24 to values which indicate they are not known.

The next step 110 causes steps 120 through 220 to be executed for each station address in the station table 24.

In step 120, a station address is read from the table 24 and then sent to all of the repeaters 18-1, 18-2, . . . and 18-n in step 130.

The next step 140 waits a particular period of time for the repeaters 18 to detect message traffic.

If no response is received after the period has elapsed, the bridge 14 assumes the station is not active and tries another station in the table 24. The proper length of time to wait depends upon the size of the local area network 10, the number of stations 20 connected thereto, and how often each of stations 20 transmits on the LAN 10. Thus, the waiting period may be quite long for a large local area network. However this is not typically a problem since the steps of FIG. 2 may be performed by the bridge 14 whenever convenient, and need not be in "real time", since the information remains current as long as the interconnection of bridges 14, repeaters 18, and stations 20 is not changed. Furthermore, a faulty station 20 becomes a problem only when it is active on the LAN 10, and once actively transmitting, it can be found quickly.

Steps 150 through 210 are performed for each repeater 18 connected to the bridge 14-1. In step 160 the repeater is polled to determine its response to the selected address. As per step 170, if the response is that a known, non-zero port number has received a message with the selected address as a source address, then the repeater number and port number are stored in steps 180 and 190, respectively.

If not response at all is received from the a repeater after a suitable time-out period, such as thirty seconds, it is assumed the repeater is not active, and the next repeater is polled.

The total amount of time to annotate the repeater number table 26 and port number table 28 depends upon the size of the local area network 10, the number of stations 20 connected thereto, and how often each of stations 20 transmits on the LAN 10. Thus, the waiting period may be quite long for a large local area network. However this is not typically a problem since the steps of FIG. 2 may be performed by the bridge 14 whenever convenient, and need not be in "real time", since the information remains current as long as the interconnection of bridges 14, repeaters 18, and stations 20 is not changed. Furthermore, a faulty station 20 becomes a problem only when it is active on the LAN 10, and once actively transmitting, it can be found quickly.

The bridge 14-1 performs steps 230 through 270 whenever requested by a control message sent from the network administrator 20m. In step 240, an index into the station address table is received from the network administrator 20m, and in step 250 the bridge station table 24 is searched to find the station address. In step 260 the repeater number and port number associated with the current station address 24n are read from the tables 26 and 28. If found, in step 270, this information is then sent back to the network administrator 20m.

Alternatively, the network administrator may request the bridge to forward the entire contents of the tables 24, 28, and 28.

FIG. 3 is a description of the sequence of steps performed by the control unit 18-a in the repeater 18-1. Step 300 sets the current port number to a value that indicates it is not yet known. In step 310, when so requested, a current station address is received from the bridge 14-1; step 320 stores it in the memory location 30.

Steps 330 through 380 are then executed for each message received at any port 18-1-0 through 18-1-7. For each such message, the source address is read in step 340. If the source address is the same as the current station address, step 360 sets the port number location 32 equal to the port number from which the message was received.

The final step 390 is executed when the repeater 18-1 is polled by the bridge 14-1 to return the observed port number information.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for determining the location of a station with a particular segment in an extended local area network given only a selected network address, the method comprising:
   forwarding the selected network address to one or more multiple-port repeaters connected to the network;
   in each multiple-port repeater, comparing the selected address with the source addresses of messages incoming to the ports of the repeater; and
   if the selected address matches the source address of a message, providing an indicator of the repeater port number on which the message was received, thereby identifying the selected network address with a particular segment.

2. A method as in claim 1 wherein one or more of the multiple-port repeaters are connected to a bridge, and the step of forwarding the selected network address is performed by the bridge.

3. A method as in claim 1 wherein the multiple-port repeaters are interconnected with one another such that a predetermined port number is used as the common port between repeaters.

4. A method as in claim 1 additionally comprising the steps of:
   maintaining a list of network addresses for the stations connected to the network;
   selecting a network address from the list of network addresses, and forwarding it to one of the repeaters;
   maintaining the repeater port number indicator associated with the network address in a list; and
   periodically repeating the above steps to maintain a list of repeater port numbers for each of the network addresses.

5. A method as in claim 4 wherein the step of maintaining a list of network addresses maintains a list of network addresses for the stations connected to a workgroup segment in the network.

6. A method as in claim 4 wherein one or more of the multiple-port repeaters are connected to a bridge, and the step of maintaining a list of the network addresses is performed by the bridge.

7. A method as in claim 4 wherein one or more of the multiple-port repeaters are connected to a bridge, and the steps of selecting a network address from the list of network addresses, maintaining the repeater port number indicator, and periodically repeating the above steps to maintain a list of repeater port numbers are performed by the bridge.

8. A method as in claim 4 wherein one or more of the multiple-port repeaters are connected to a bridge, and the step of maintaining the repeater port number indicator associated with the network address in a list is performed by the bridge.

9. A method as in claim 1 wherein the indicator of the repeater port number includes both a particular repeater number and a port number of a particular repeater.

10. A method for automatically tracking the topology of an extended local area network by augmenting a station address list kept by a bridge with a list of repeater numbers and repeater port numbers, comprising the steps of:
    periodically iterating through the station address list to determine a selected station address;
    forwarding the selected station address to one or more repeaters connected to the bridge;
    in the repeaters, watching for the selected address to appear as a source address in a message on one of their ports; and
    upon seeing the selected address on a port, reporting a repeater port number back to the bridge.

11. A method as in claim 10 wherein the multiple-port repeaters are interconnected with one another such that a predetermined port number is used as the common port between repeaters.

12. An apparatus for associating the location of a network station with a particular segment in an extended local area network, given only the network address of the station, the apparatus comprising:
    means for forwarding the network address to one or more multiple-port repeaters connected to the network;
    means for comparing the network address to the source addresses of messages incoming to the ports of the repeaters; and
    means for providing an indicator of the repeater port number on which the message was received, if the means for comparing determines that the network address matches the source address of a message, and thereby for associating the network address with a particular segment.

13. An apparatus as in claim 12 wherein one or more of the multiple-port repeaters are connected to a bridge, and the means for forwarding the network address is disposed within the bridge.

14. An apparatus as in claim 12 wherein the multiple-port repeaters are interconnected with one another such that a predetermined port number is used as the common port between repeaters.

15. An apparatus as in claim 12 additionally comprising:
    means for maintaining a list of network addresses for the stations connected to the network;
    means for selecting a network address from the list of network addresses, and for forwarding the network address selected thereby to one of the repeaters;
    means for maintaining the repeater port number indicator associated with a given network address in a list; and
    means for iterating through the list of network addresses to maintain a list of repeater port numbers for each of the stations connected to the network.

16. An apparatus as in claim 15 wherein one or more of the multiple-port repeaters are connected to a bridge, and the means for maintaining a list of the network addresses is disposed within the bridge.

17. An apparatus as in claim 15 wherein the indicator of the repeater port number includes both a particular repeater number and a port number of a particular repeater.

18. An extended local area network for automatically determining the location of a network station, wherein the network includes a bridge having a workgroup port and a backbone port, and the network includes a plurality of multiple-port repeaters, the multiple-port repeaters each having a plurality of repeater ports, with at least one repeater port connected to the workgroup port of the bridge, so that at least one port of each repeater is connected in parallel with at least one port of the other repeaters and in parallel with the workgroup port of the bridge, and at least one of the remaining ports of at least one of the multiple-port repeaters is connected to a local area network segment including a plurality of network stations interconnected by a network medium, wherein the bridge further comprises:
  memory means, for storing the addresses of the stations connected to the bridge, and a repeater number and repeater port number for each station address;
  means for reading a selected station address from one of the locations in the station address table memory, and for forwarding the selected station address to the multiple-port repeaters;
  means for receiving a port number value and a repeater number value from one of the multiple-port repeaters in response to sending a repeater port value request control message to the repeaters;
  means for storing the received port number value and repeater number in the memory means;

and wherein the multiple-port repeaters each comprise:
  means for storing the selected station address;
  means for comparing the selected station address to the source address portion of incoming messages received on the plurality of repeater ports, and for determining if the selected station address is equal to the source address of an incoming message;
  means for determining the port number associated with the port on which the incoming message was received; and
  means for forwarding the port number value to the bridge in response to receiving a port value request control message.

19. An extended local area network as in claim 18 wherein the multiple-port repeaters further comprise:
  means for determining a repeater number associated with each repeater; and
  means for forwarding the repeater number value to the bridge in response to receiving a port value request control message.

20. An extended local area network as in claim 18 wherein the memory means in the bridge further comprises:
  a station address table memory, having a plurality of memory locations for storing the addresses of the stations connected to at least the workgroup port of the bridge;
  a repeater number table memory, having a plurality of locations, with a repeater number location associated with each location in the station address table memory; and
  a repeater port table memory, having a plurality of locations, with a repeater port number location associated with each location in the station address table memory.

* * * * *